United States Patent [19]

Larson

[11] Patent Number: 5,126,208
[45] Date of Patent: Jun. 30, 1992

[54] OPTICAL LAMINATES

[75] Inventor: Kent R. Larson, Midland, Mich.

[73] Assignee: Dow Corning Corporation, Midland, Mich.

[21] Appl. No.: 596,840

[22] Filed: Oct. 12, 1990

[51] Int. Cl.$^5$ .................... B32B 17/10; B32B 27/40
[52] U.S. Cl. .................. 428/425.5; 428/425.6; 428/429; 428/447; 428/448
[58] Field of Search ............... 428/425.5, 425.6, 429, 428/447, 448

[56] References Cited

U.S. PATENT DOCUMENTS

| | | | |
|---|---|---|---|
| 3,341,399 | 11/1966 | Hazdra et al. | 161/193 |
| 3,657,057 | 4/1972 | Shorr et al. | 161/2 |
| 3,881,043 | 4/1975 | Rieser et al. | 428/81 |
| 3,900,686 | 8/1975 | Ammons et al. | 428/425 |
| 3,987,449 | 10/1976 | Deangelis et al. | 343/713 |
| 4,020,217 | 4/1977 | Karasudani et al. | 428/429 |
| 4,059,469 | 11/1977 | Mattimoe et al. | 156/108 |
| 4,073,986 | 2/1978 | Keslar et al. | 428/38 |
| 4,235,954 | 11/1980 | Humphrey, Jr. | 428/412 |
| 4,312,693 | 1/1982 | Salensky et al. | 156/272 |
| 4,364,786 | 12/1982 | Smith, Jr. et al. | 156/99 |
| 4,659,851 | 4/1987 | Plueddemann | 556/431 |
| 4,719,262 | 1/1988 | Plueddemann | 525/105 |
| 4,795,775 | 1/1989 | Baile et al. | 524/379 |

FOREIGN PATENT DOCUMENTS 735398 5/1966 Canada .
735399 5/1966 Canada .

Primary Examiner—Paul J. Thibodeau
Assistant Examiner—D. S. Nakarani
Attorney, Agent, or Firm—Edward C. Elliott

[57] ABSTRACT

An optical laminate having improved resistance to delamination upon exposure to moisture consists essentially of a layer of organosiloxane composition, a primer layer, and a layer of organic elastomer. The organosiloxane composition comprises a polydiorganosiloxane gum containing at least two ethylenically unsaturated hydrocarbon radicals per molecule, an organohydrogensiloxane containing at least two silicon-bonded hydrogen atoms per molecule, and a platinum containing hydrosilation catalyst. The primer comprises a specific mixture of organosilicone compound, silane copolymer, organohydrogensiloxane, and solvent being as least 50 percent of an ethylenically unsaturated alcohol. The organic elastomer is selected from a polyvinylbutyral or polyurethane of the types used for optical laminates.

9 Claims, No Drawings

OPTICAL LAMINATES

BACKGROUND OF THE INVENTION

1. Field of the Invention

This invention relates to optical laminates used as windows, commonly containing at least one rigid layer and one flexible layer.

2. Background Information

Optical laminates are commonly used as protective windows, as in automobiles or airplanes, to protect the occupants from broken glass if something strikes the window with sufficient force to break it. As vehicle speeds increased, work was done to improve the bonding of the rigid layers of the laminate to the elastomeric layers. U.S. Pat. No. 3,341,399, issued Sep. 12, 1967 teaches use of an aqueous solution of a triethoxysilane containing a lower aliphatic alcohol as a treatment on glass surfaces to improve the bonding of polyvinylbutyral between the glass surfaces.

An improved interlayer for laminated safety windows exposed to temperature extremes is taught in Canadian patents 735,398 and 735,399, issued, May 31, 1966. The interlayer is composed of a combination of at least a sheet of transparent organosilicon elastomer and a sheet of synthetic resinous material, such as polyvinylbutyral.

An improved method of bonding a cured sheet of polyurethane to a rigid transparent sheet is taught in U.S. Pat. No. 3,657,057, issued Apr. 18, 1972. A polymerizable polyurethane resin is placed between the cured polyurethane sheet and the rigid transparent sheet before lamination.

A transparent laminated window comprising a pair of glass sheets and an interlayer of polyurethane susceptible of having its adhesion to glass impaired by exposure to moisture is improved by use of an adhesion promoting organosilane coupling agent on a portion of the window between the glass and the polyurethane as taught in U.S. Pat. No. 3,881,043, issued Apr. 29, 1975.

U.S. Pat. No. 3,900,686, issued Aug. 19, 1975, teaches an improved polyurethane composition containing an organic silane and an organic phosphorus acid. The composition can be varied to control the degree of adhesion to glass maintainable under a wide range of humidity and temperature conditions.

A windshield having an antenna incorporated is taught in U.S. Pat. No. 3,987,449, issued Oct. 19, 1976. The description of the construction teaches use of a polyurethane containing gamma-glycidoxy-propyltrimethoxysilane in the polyurethane used as the adhesive layer.

A laminated glass-plastic glazing unit comprising an outer and inner sheet of transparent rigid material, at least one being glass, having an interlayer of plasticized polyvinylbutyral is described in U.S. Pat. No. 4,073,986, issued Feb. 14, 1978. The glass and polyvinylbutyral have a continuous layer of transparent polyurethane disposed between them to prevent cold chipping of the glass. An adhesion promoter may be necessary between the glass ply and the polyurethane ply.

A process for producing a non-symmetrical laminate of glass and plastic comprising treating a glass blank with a difunctional silane, forming a first laminate by placing a sheet of an aliphatic polyether polyurethane against the primed glass blank and heating, then placing a polycarbonate or polyacrylate sheet against the polyurethane and heating and pressurizing is taught in U.S. Pat. No. 4,364,786, issued Dec. 21, 1982.

A variety of organosilicone compounds are used as primers in order to cohesively bond polydiorganosiloxane elastomers and resins to organic and inorganic substrates. Plueddemann teaches silanes and bis-silylhydrocarbons that contain a plurality of silicon-bonded alkoxy groups and at least one substituent that is bonded to silicon through oxygen and contain at least four carbon atoms, two of which form a terminal group of the formula $CH_2=CH-$ in U.S. Pat. Nos. 4,659,851, issued Apr. 21, 1987, and 4,719,262, issued Jan. 12, 1988. An improved primer composition for use with amorphous polymers such as polymethylmethacrylate and polycarbonates is disclosed by Baile et al. in U.S. Pat. No. 4,795,775, issued Jan. 3, 1989.

SUMMARY OF THE INVENTION

An optical laminate containing an interface between a platinum catalyzed hydrosilation curable polydiorganosiloxane and an organic elastomer selected from the group consisting of polyvinylbutyral and polyurethane is improved by priming the organic elastomer with a specific organosilicon primer composition. The primer composition comprises (A) at least one member of a specified group of ethylenically unsaturated organosilicon compounds containing silicon-bonded alkoxy groups, (B) silicone/organic copolymers prepared from esters of ethylenically unsaturated organic acids and organosilicone compounds derived from these acids, (C) organohydrogensiloxane curing agents, and (D) a solvent which is at least 50 percent by weight of an ethylenically unsaturated alcohol containing from 4 to 6 carbon atoms.

DESCRIPTION OF THE INVENTION

Optical laminates which bond a rigid glass or plastic layer to an elastomeric layer of polyurethane or polyvinylbutyral are improved in their resistance to moisture by placing an adhesive layer of polydiorganosiloxane between the rigid layer and the organic elastomeric layer. Further improvement in the resistance to moisture is found in an optical laminate consisting essentially of (1) a layer of organosiloxane composition curable by a platinum-catalyzed hydrosilation reaction comprising a polydiorganosiloxane gum containing at least two ethylenically unsaturated hydrocarbon radicals per molecule, an organohydrogensiloxane containing at least two silicon-bonded hydrogen atoms per molecule, and a platinum-containing hydrosilation catalyst; (2) a primer layer prepared from a composition comprising (A) an organosilicon compound of the formula $(R^1O)_n(R^2O)_{(3-n)}SiR^3Si(OR^1)_r(OR^2)_{(3-r)}$ where $R^1$ represents $CH_2=CHR^4OR^5-$, $R^2$ represents an alkyl radical containing from 1 to 4 carbon atoms, $R^3$ represents an alkylene radical containing at least 2 carbon atoms, $R^4$ represents an alkylene radical, $R^5$ represents an alkylene or substituted alkylene radical where $R^5$ contains at least 2 carbon atoms and the substituent is a hydroxy, alkoxy, or $CH_2=CHR^4O-$ group, n is 1 or 2, and r is 0 or 1, (B) a copolymer derived from (a) at least one ester of an ethylenically unsaturated aliphatic carboxylic acid and (b) at least one silane of the formula $R^7COOR^6SiX_3$ where $R^6$ represents an alkylene radical, $R^7$ represents a terminally unsaturated alkenyl radical, and X represents a hydrolyzable group, (C) an organohydrogensiloxane containing an average of at least two silicon-bonded hydrogen atoms per molecule, and (D) an amount of solvent sufficient to dissolve said composition, the solvent being at least 50 weight percent of an ethylenically unsaturated alcohol containing 4, 5, or 6 carbon atoms or a mixture of said alcohols; (3) a layer of organic elastomer selected from the group consisting of polyvinylbutyral and polyurethane, the primer layer (2) being between the layer of organosiloxane composition (1) and the layer of organic elastomer (3).

Optical laminates as considered in this invention comprise a combination of different layers which are bonded together and are optically transparent. The most common optical laminates are those found in automobiles where two sheets of glass are bonded together with a sheet of polyvinylbutyral. In some cases one or both of the glass sheets are replaced by a rigid organic sheet such as polycarbonate or acetate. An improved interlayer is formed when the polyvinylbutyral is replaced with polyurethane in that the polyurethane can be formulated so that it will absorb more energy upon impact against the laminate. One of the problems which has become evident is the lack of resistance to moisture in the bond between polyurethane and the rigid sheet of glass or polycarbonate. Silicone based primers have been developed for improving the bond between organic interlayers and the rigid sheet in such laminates.

Organosiloxane compositions have also been developed which are useful as interlayer in optical laminates. These materials are particularly useful in aircraft windshields where the laminate is subjected to elevated temperatures which cause failures in the thermoplastic materials commonly used for interlayer. Other uses include such things as tank and submarine periscopes and for electronic display systems, such as CTR screens. The organosiloxane compositions normally bond well to glass sheets, but not as well to organic sheets such as polycarbonate, polystyrene, or polyacrylate, derived from ester of acrylic or methacrylic acid. Organosilicon compounds useful for improving the bond of silicone interlayer to rigid organic substrates are taught in U.S. Pat. Nos. 4,659,851, 4,719,262, and 4,795,775.

When a sheet of an organic elastomer such as polyurethane or polyvinylbutyral is laminated to a sheet of glass, a strong bond results. However, if this laminate is subjected to moisture, the bond strength deteriorates, sometimes to the point of failure. An improved laminate results if an intermediate sheet of organosiloxane is placed between the glass layer and the organic layer in that the resistance to moisture is improved. An even greater improvement in resistance to moisture is found if the specific silicone primer of this invention is used between the organosiloxane layer and the organic layer of polyurethane or polyvinylbutyral.

This invention relates specifically to the use of silicone primer between a layer of organosiloxane composition and a layer of organic elastomer. This combination can also be further used in combination with layers of glass or rigid organic polymers to produce optical laminates useful as canopies, windshields, periscopes, and other transparent objects. A typical optical laminate for use as a windshield for example could consist of successive layers of glass, organosilicone composition, silicone primer, polyurethane, silicone primer, organosilicone composition, primer, and polycarbonate.

The layer of organosiloxane composition is an organosiloxane composition curable by a platinum-catalyzed hydrosilation reaction comprising a polydiorganosiloxane gum containing at least two ethylenically unsaturated hydrocarbon radicals per molecule, an organohydrogensiloxane containing at least two silicon-bonded hydrogen atoms per molecule, and a platinum-containing hydrosilation catalyst. These types of organosiloxane compositions are well known in the art. The major ingredient is a gum-type polydiorganosiloxane containing at least two ethylenically unsaturated hydrocarbon radicals that are preferably located at the terminal positions of the molecule. The polymers are typically characterized in terms of a Williams Plasticity Number that is generally between about 50 and 250, measured in accordance with ASTM test procedure No. D 926. In addition to terminally ethylenically unsaturated hydrocarbon radicals, from 0.1 to 0.4 mole percent of the non-terminal diorganosiloxane units in the polymer can contain a monovalent, ethylenically unsaturated hydrocarbon radical. The organic radicals of the polydiorganosiloxane include, but are not limited to methyl, ethyl, propyl, phenyl, benzyl, cyclohexyl, and halogenated radicals such as 3,3,3-trifluoropropyl. The ethylenically unsaturated hydrocarbon radicals are preferably vinyl and allyl.

The organohydrogensiloxane containing at least two silicon-bonded hydrogen atoms per molecule reacts with the ethylenically unsaturated hydrocarbon radical of the polydiorganosiloxane to crosslink the polymer and form an elastomer in the presence of a platinum catalyst. The organohydrogensiloxane can contain from as few as four silicon atoms per molecule up to an average of 20 or more, and can have a viscosity of up to 10 Pa.s or higher at 25° C.

The platinum-containing hydrosilation catalyst is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. There complexes are described in U.S. Pat. No. 3,419,593, issued Dec. 31, 1968 to David Willing.

The organosiloxane composition can be reinforced with a reinforcing filler such as fumed silica to improve the physical strength. Reinforcing silica fillers have a surface area of greater than 50 m²/g, preferably greater than 150 m²/g. They may be treated to improve compatibility with the polymer. A preferred filler is disclosed in U.S. Pat. No. 4,344,800, issued Aug. 17, 1982 to M. Lutz. This patent is hereby incorporated by reference as a teaching of silica fillers suitable for use in the organopolysiloxane compositions used in this invention.

An improved organopolysiloxane composition useful in this invention is described in commonly assigned U.S. patent application Ser. No. 07/322,014, filed Mar. 13, 1989, which patent application is hereby incorporated by reference to teach an organosiloxane composition.

The layer of organic elastomer selected from the group consisting of polyvinylbutyral and polyurethane can be any of the well known products used commercially in the preparation of optical laminates such as windows. Polyvinylbutyral used in optical laminates is described, for example, in U.S. Pat. No. 3,341,399. Polyurethanes used in optical laminates are described, for example, in U.S. Pat. Nos. 3,657,057, 3,881,043, 3,900,686, and 3,987,449. These patents are hereby incorporated by reference to teach suitable polyvinylbutyral and polyurethane.

The primer layer used between the layer of organosiloxane and the layer of organic elastomer is prepared from a composition comprising (A) an organosilicon compound of the formula $(R^1O)_n(R^2O)_{(3-n)}SiR^3-Si(OR^1)_r(OR^2)_{(3-r)}$ where $R^1$ represents $CH_2=CHR^4OR^5-$, $R^2$ represents an alkyl radical containing from 1 to 4 carbon atoms, $R^3$ represents an alkylene radical containing at least 2 carbon atoms, $R^4$ represents an alkylene radical, $R^5$ represents an alkylene or substituted alkylene radical where $R^5$ contains at least 2 carbon atoms and the substituent is a hydroxy, alkoxy, or $CH_2=CHR^4O-$ group, n is 1 or 2, and r is 0 or 1, (B) a copolymer derived from (a) at least one ester of an ethylenically unsaturated aliphatic carboxylic acid and (b) at least one silane of the formula $R^7COOR^6SiX_3$ where $R^6$ represents an alkylene radical, $R^7$ represents a terminally unsaturated alkenyl radical, and X represents a hydrolyzable group, (C) an organohydrogensiloxane containing an average of at least two silicon-bonded hydrogen atoms per molecule, and (D) an amount of solvent sufficient to dissolve said composition, the solvent being at least 50 weight percent of an ethylenically unsaturated alcohol containing 4, 5, or 6 carbon atoms or a mixture of said alcohols. This primer composition is described in U.S. Pat. No. 4,795,775, issued Jan. 3, 1989, which patent is incorporated by reference to teach the primer composition and its preparation.

A primer composition which gives improved results at elevated temperatures comprises the composition described above in U.S. Pat. No. 4,795,775 plus the addition of an organic peroxide having a half life at 100° C. of at least 30 minutes. Preferred peroxides include benzoyl peroxide, 2,4-dichlorobenzoyl peroxide, di-t-butyl peroxide, dicumyl peroxide, 2,5,-bis(t-butylperoxy-2,5,dimethyl-hexane) and 1.1-di(t-butylperoxy)-3,3,5-trimethylcyclohexane, with t-butylperoxyisopropyl carbonate the most preferred peroxide. This improved primer is described in commonly assigned U.S. patent application Ser. No. 07/491,791, filed Mar. 12, 1990, which application is hereby incorporated by reference to show primers and their manufacture.

The optical laminate of this invention is prepared by first applying a coating of the primer composition on a surface of the organic elastomer. Only a thin coating of the primer is required, it can be as little as about 1 micron after drying. The primer composition can be applied by wiping, painting, use of a roller, or spraying, as long as a uniform, thin coat is applied. The primer composition is then allowed to dry so that the solvent is no longer present. Next the layer of organosiloxane composition is placed in contact with the primed surface of the organic elastomer. The laminate is then subjected to sufficient heat and pressure to cause bonding between the organic elastomer and the organosiloxane composition. The cure temperature of the elastomer is typically between 80° and 150° C. with a pressure of from 10 to 200 pounds per square inch. After bonding, the laminate is cooled, and the pressure removed to obtain a laminate which is firmly bonded together and which does not lose bond upon exposure to moisture.

The optical laminate of a layer of organosiloxane composition bonded to a layer of organic elastomer can also be a part of a multilayer optical laminate in which the organosiloxane composition is further bonded to another layer, such as a layer of glass or rigid organic polymer such as polycarbonate or acetate. Multilayer laminates of many different types of constructions can be prepared in which the layers are symmetrical in that the two sides are similar or the layers may be asymmetrical in which the two sides are dissimilar. A typical construction would be glass layer, organosiloxane composition, primer, polyurethane layer, primer, organosiloxane composition, primer, and polycarbonate layer. Multiple laminates are also used as in bullet proof glass in which several layers of different glass and rigid organic polymer layers are used to dissipate the impact.

The following examples are included for illustrative purposes only and should not be construed as limiting the invention which is properly set forth in the appended claims. Parts are parts by weight.

EXAMPLE 1

An optical laminate was prepared of layers of glass, polydiorganosiloxane, and polyvinylbutyral.

The glass layer was a sheet of window glass which had been cleaned by wiping vigorously with hexane, then methanol, and then allowed to dry.

The layer of polydiorganosiloxane was a 0.025 inch thick sheet of an optical silicone composition which had been calendared and cured. The composition was prepared by mixing 54.8 parts of polydiorganosiloxane gum having about 0.14 mol percent vinyl radicals and the rest methyl radicals with dimethylvinylsiloxy endblockers and a Williams Plasticity of about 150, 9.7 parts of hydroxyl endblocked polydimethylsiloxane having a Williams plasticity number of about 152, and 35.5 parts of silica filler of the type described in U.S. Pat. No. 4,344,800, issued to M. Lutz on Aug. 17, 1982, to make a base. Then 97.9 parts of this base was mixed with 1.4 parts of trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent, 1.25 parts of gamma-methacryloxypropyltrimethoxysilane, 0.3 part of cyclic methylvinylsiloxanes, 0.1 part of chloroplatinic acid complex of divinyltetramethyldisiloxane diluted with dimethylvinylsiloxy endblocked polydimethylsiloxane to provide 0.7 weight percent platinum, and 0.6 part of ethynylcyclohexanol.

The layer of polyvinyl butyral was a 0.025 inch thick sheet of optical aircraft grade polyvinylbutyral of a type recommended for primerless uses on glass. One surface of this layer was primed by wiping on a thin coating of silicone primer, then drying for 1 hour at 25° C. and 50 percent relative humidity. The silicone primer was prepared by blending 2 parts of the product obtained by reacting equimolar amounts of 1,2-bis(trimethoxysilyl)ethane and the diallyl ether of trimethylolpropane in the presence of 1 percent by weight of tetrabutyltitanate, 10 parts of a 20 percent by weight solution in ethyl acetate of a methyl methacrylate/3-methacryloxypropyltrimethoxysilane copolymer, 1 part of a trimethylsiloxy endblocked polymethylhydrogensiloxane exhibiting a viscosity of 0.13 Pa.s, and 87 parts of 3-methyl-1-buten-3-ol.

An optical laminate was prepared by laying down the sheet of cleaned glass, placing the sheet of polydiorganosiloxane over the cleaned surface, then placing the sheet of polyvinyl butyral over it with the primed side next to the polydiorganosiloxane. A sheet of 40 mesh steel screen was placed over the polyvinylbutyral as reinforcement, then a sheet of polyvinylbutyral placed over the screen. The layup was then laminated by placing in an electrically heated press at 110° C. for 1 hour at 100 psi between flat steel plates. After cooling, the laminate was removed from the press.

The laminate was evaluated by placing in a beaker of boiling water to simulate accelerated environmental aging. The laminate came apart about 450 hours after the test started. At the time the laminate came apart, the peel strength was estimated to be about 5 psi. The predominant mode of failure was at the silicone/primer/PVB interface.

EXAMPLE 2

An optical laminate was prepared of layers of glass, polydiorganosiloxane, primer, and polyurethane.

A laminate was prepared in the same manner as in Example 1, except a 0.025 inch thick sheet of optical grade polyurethane was substituted for the sheet of polyvinylbutyral. The laminate was tested in the same manner as in Example 1, the laminate failing in 350 hours at the silicone/primer/polyurethane interface.

EXAMPLE 3

An optical laminate was prepared from layers of glass and polyvinylbutyral.

A sheet of glass was cleaned as in Example 1, a 00.025 inch thick sheet of the polyvinyl butyral of Example 1 was placed over the glass and the laminate was pressed as in Example 1. When tested as in Example 1, the laminate failed in about 90 minutes.

EXAMPLE 4

An optical laminate was prepared from layers of glass and polyurethane.

A sheet of glass was cleaned as in Example 1, a 0.025 inch thick sheet of the polyurethane of Example 2 was placed over the glass and the laminate was pressed as in Example 1. When tested as in Example 1, the laminate failed in about 5.5 hours.

EXAMPLE 5

An optical laminate was prepared from layers of glass and polydiorganosiloxane.

A sheet of glass was prepared as in Example 1, a 0.025 inch thick sheet of the polydiorganosiloxane of Example 1 was placed over the glass and the laminate was pressed as in Example 1. When tested as in Example 1, the laminate failed in about 500 hours.

EXAMPLE 6

A laminate was prepared of layers of polyvinylbutyral and polydiorganosiloxane. This is a comparative example.

A sheet of 0.050 inch thick polydiorganosiloxane as in Example 1 was laid onto a sheet of 0.033 in thick polyvinylbutyral. This laminate was then laminated by placing in an electrically heated press for 1 hour at 110° C. and 100 psi between flat steel plates. After cooling and removal from the press, the laminate could be easily pulled apart by hand (estimate about 10 ppi peel strength).

EXAMPLE 7

A laminate was prepared of layers of primed polyvinylbutyral and polydiorganosiloxane.

A sheet of 0.033 inch thick polyvinylbutyral was primed with the silicone primer of Example 1 by wiping on the primer (leaving a thin coat, approximately 1 micron thick when dry) and allowing the primer to dry for 1 hour at 23° C. and 50 percent relative humidity.

Onto this primed surface was placed a 0.050" sheet of the polydiorganosiloxane of Example 1 and the resulting laminate was placed in a press between flat steel sheets and cured for 1 hour at 110° C. and 100 psi. After cooling and removal from the press, adhesion was evaluated. Using a 2 inch per minute pull rate at 180 degrees, the peel adhesion strength was measured at various temperatures, with the results as shown in the table.

A similar laminate was prepared and tested as above, but using a sheet of polyurethane in place of the polyvinylbutyral. The peel results are found in the table.

TABLE

| Peel Temperature | Peel Strength, ppi | |
|---|---|---|
| | PVB | PU |
| −50° C. | 100 | 100 |
| 22 | 80 | 45 |
| 75 | 40 | 20 |
| 110 | 20 | 3 |

EXAMPLE 8

Comparative examples were prepared using other primers.

A sheet of 0.025 inch thick polyurethane was primed with primer containing 4.3 percent by weight epoxy resin and 0.5 percent N-(beta-aminoethyl)gamma-aminopropyltrimethoxysilane in solvent. This is a commercial primer recommended for improving adhesion to plastics. After the primer dried for 1 hour a 0.050 inch thick sheet of optical silicone composition was placed onto the primed polyurethane surface and steel mesh screen were placed on each outer surface of the laminate. The optical silicone composition was prepared by mixing 98.51 parts of the base of Example 1, 0.83 part of the hydrogen containing polydiorganosiloxane, 0.3 part of the silane, 0.2 part of the cyclic methylvinylsiloxane, 0.09 part of the platinum catalyst, and 0.06 part of the ethynylcyclohexanol. The laminate was placed between steel plates and press cured at 100 psi and 100° C. for 1 hour. It was then tested for peel strength and found to give 17 ppi with 0 percent cohesive failure when tested at room temperature.

A second sample was prepared using the above procedure, but a sheet of polyvinylbutyral was substituted for the polyurethane. The peel strength was 25 ppi, with 80 percent cohesive failure.

A third sample was prepared using the procedure of sample 1, but using as the primer a solvent solution of an acetoxy and vinyl functional resin reacted with ethylpolysilicate which is recommended for use with plastics. The peel strength was 17 ppi with 0 percent cohesive failure.

A forth sample was prepared as for sample three, but using polyvinylbutyral as in sample 2. The peel strength was 36 ppi, with 70 percent cohesive failure.

That which is claimed is:

1. An optical laminate consisting essentially of (1) a layer of organosiloxane composition curable by a platinum-catalyzed hydrosilation reaction comprising a polydiorganosiloxane gum containing at least two ethylenically unsaturated hydrocarbon radicals per molecule, an organohydrogensiloxane containing at least two silicon-bonded hydrogen atoms per molecule, and a platinum-containing hydrosilation catalyst; (2) a primer layer prepared from a composition comprising (A) an organosilicon compound of the formula $(R^1O)n(R^2O)_{(3-n)}SiR^3Si(OR^1)_r(OR^2)(3-r)$ where $R^1$ represents $CH_2=CHR^4OR^5-$, $R^2$ represents an alkyl radical containing from 1 to 4 carbon atoms, $R^3$ represents an alkylene radical containing at least 2 carbon atoms, $R^4$ represents an alkylene radical, $R^5$ represents an alkylene or substituted alkylene radical where $R^5$ contains at least 2 carbon atoms and the substituent is a hydroxy, alkoxy, or $CH_2=CHR^4O-$ group, n is 1 or 2, and r is o or 1, (B) a copolymer derived from (a) at least one ester of an ethylenically unsaturated aliphatic carboxylic acid and (b) at least one silane of the formula $R^7COOR^6SiX_3$ where $R^6$ represents an alkylene radical, $R^7$ represents a terminally unsaturated alkenyl radical, and X represents a hydrolyzable group, (C) an organohydrogensiloxane containing an average of at least two silicon-bonded hydrogen atoms per molecule, and (D) an amount of solvent sufficient to dissolve said composition, the solvent being at least 50 weight percent of an ethylenically unsaturated alcohol containing 4, 5, or 6 carbon atoms or a mixture of said alcohols; (3) a layer of organic elastomer selected from the group consisting of polyvinylbutyral and polyurethane; the primer layer (2) being between the layer of organosiloxane composition (1) and the layer of organic elastomer (3).

2. The optical laminate of claim 1 wherein the organic elastomer layer (3) is a polyurethane.

3. The optical laminate of claim 1 wherein the organic elastomer layer (3) is a polyvinylbutyral.

4. The optical laminate of claim 1 further bonded to additional layers of glass or rigid organic polymer selected from the group consisting of polycarbonates, polystyrene, polyacrylate derived from an ester of acrylic or methacrylic acid or organic elastomer selected from the group consisting of polyurethanes and polyvinylbutyral.

5. The optical laminate of claim 1 in which the composition used in (2) also contains an organic peroxide having a half life at 100° C. of at least 30 minutes.

6. The optical laminate of claim 2 further bonded to additional layers of glass or rigid organic polymer selected from the group consisting of polycarbonates, polystyrene, polyacrylate derived from an ester of acrylic or methacrylic acid or organic elastomer selected from the group consisting of polyurethanes and polyvinylbutyral.

7. The optical laminate of claim 2 in which the composition used in (2) also contains an organic peroxide having a half life at 100° C. of at least 30 minutes.

8. The optical laminate of claim 3 further bonded to additional layers of glass or rigid organic polymer selected from the group consisting of polycarbonates, polystyrene, polyacrylate derived from an ester of acrylic or methacrylic acid or organic elastomer selected from the group consisting of polyurethanes and polyvinylbutyral.

9. The optical laminate of claim 3 in which the composition used in (2) also contains an organic peroxide having a half life at 100° C. of at least 30 minutes.

* * * * *